Jan. 25, 1938.   C. F. FREDE   2,106,345
AXLE STRUCTURE
Filed Oct. 11, 1933   4 Sheets-Sheet 1
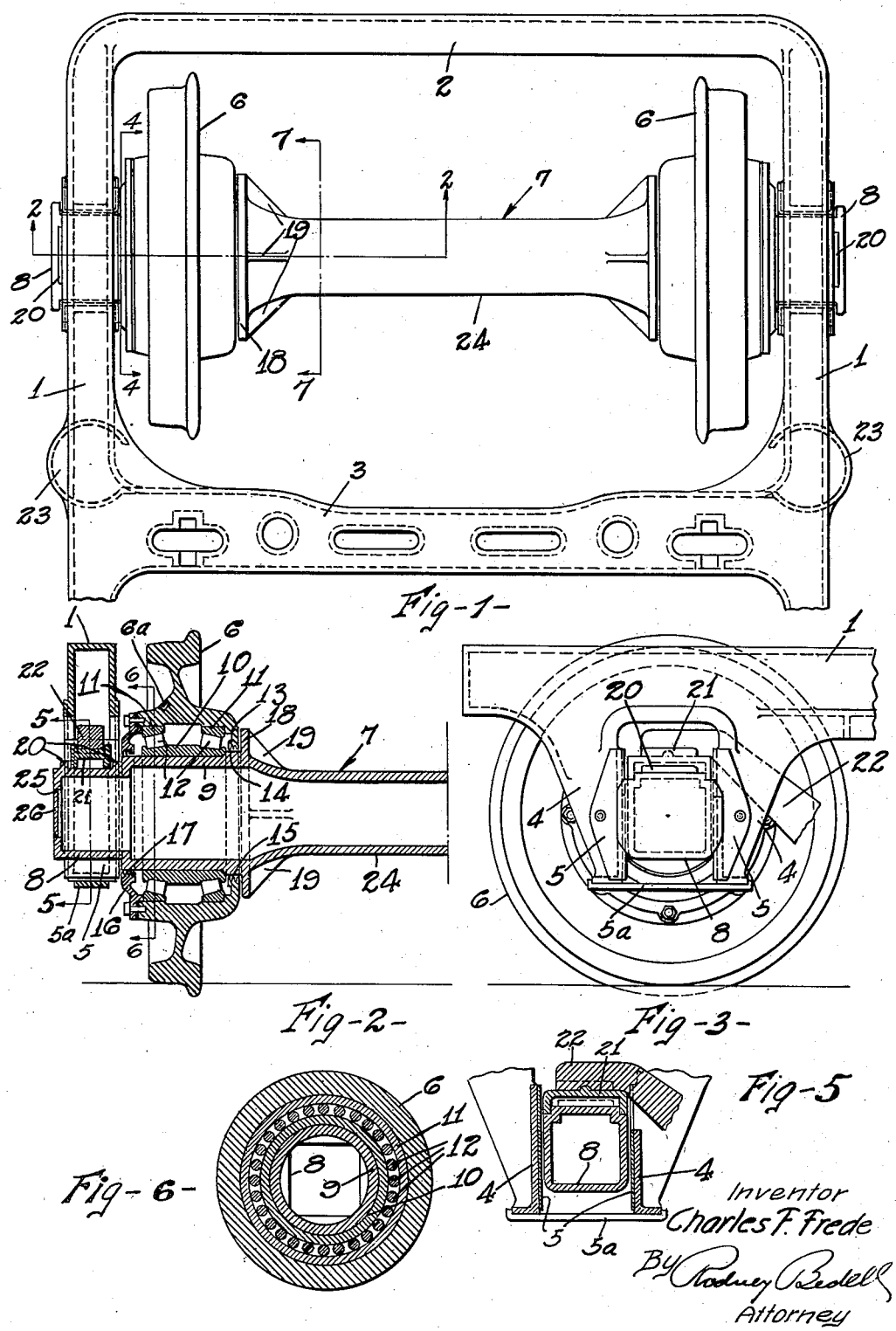
Inventor
Charles F. Frede
By Rodney Bedell
Attorney Jan. 25, 1938.  C. F. FREDE  2,106,345
AXLE STRUCTURE
Filed Oct. 11, 1933  4 Sheets-Sheet 2
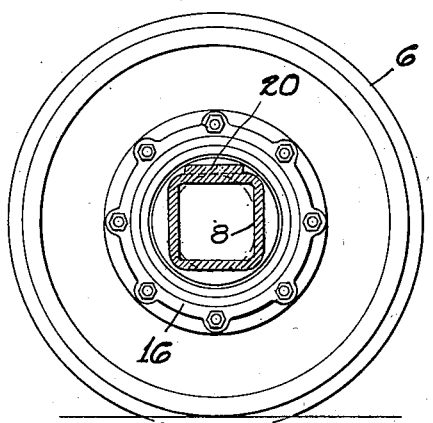
Fig-4-
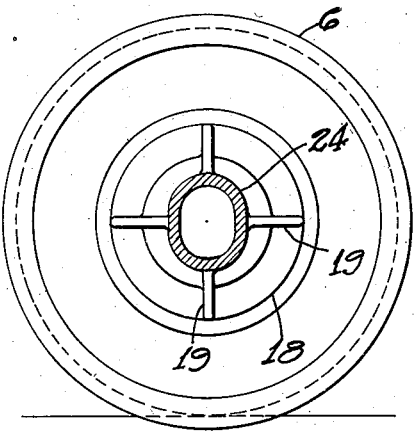
Fig-7-
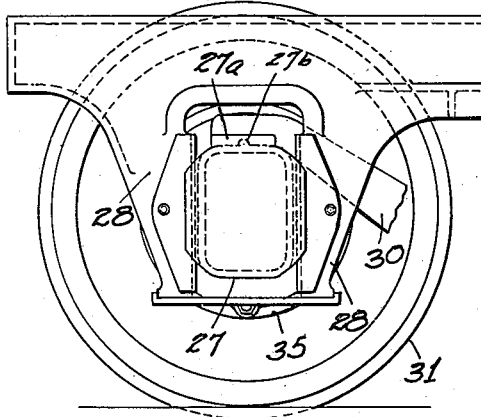
Fig-8-
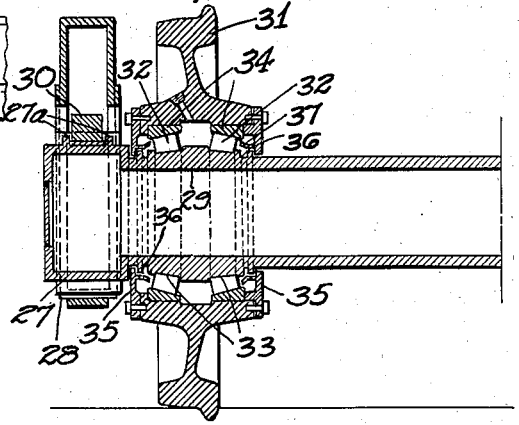
Fig-9-
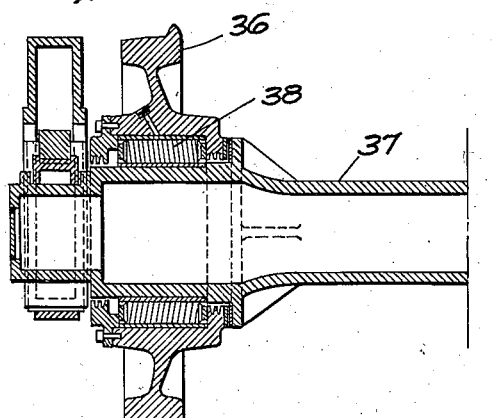
Fig-10-
Inventor
Charles F. Frede
By Rodney Bedell
Attorney Jan. 25, 1938.   C. F. FREDE   2,106,345
AXLE STRUCTURE
Filed Oct. 11, 1933   4 Sheets-Sheet 3
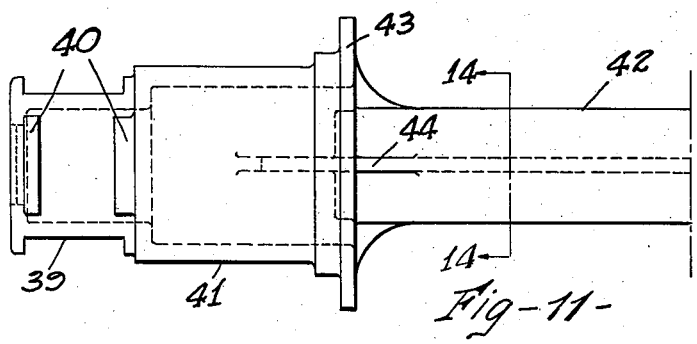
Fig-11-
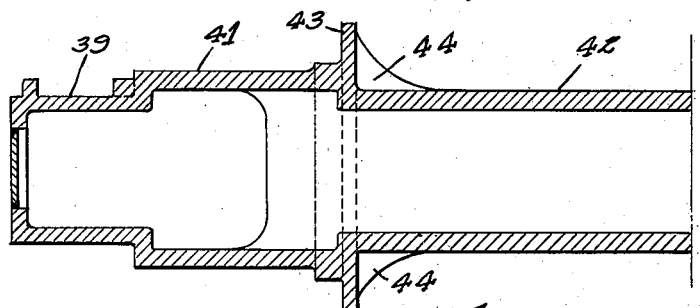
Fig-12-
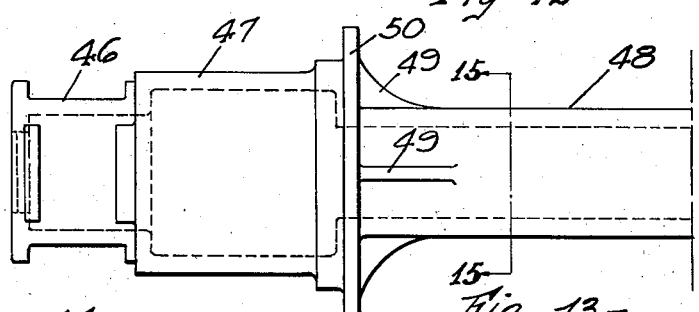
Fig-13-
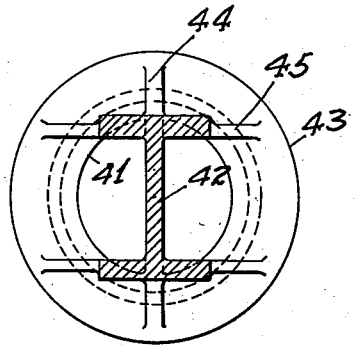
Fig-14-
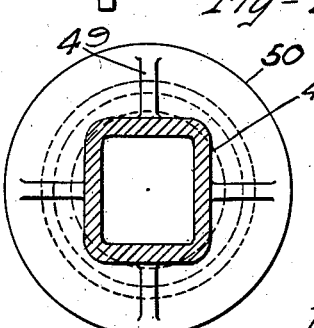
Fig-15-
Inventor
Charles F. Frede
By Rodney Bedell
Attorney Jan. 25, 1938.  C. F. FREDE  2,106,345
AXLE STRUCTURE
Filed Oct. 11, 1933   4 Sheets-Sheet 4
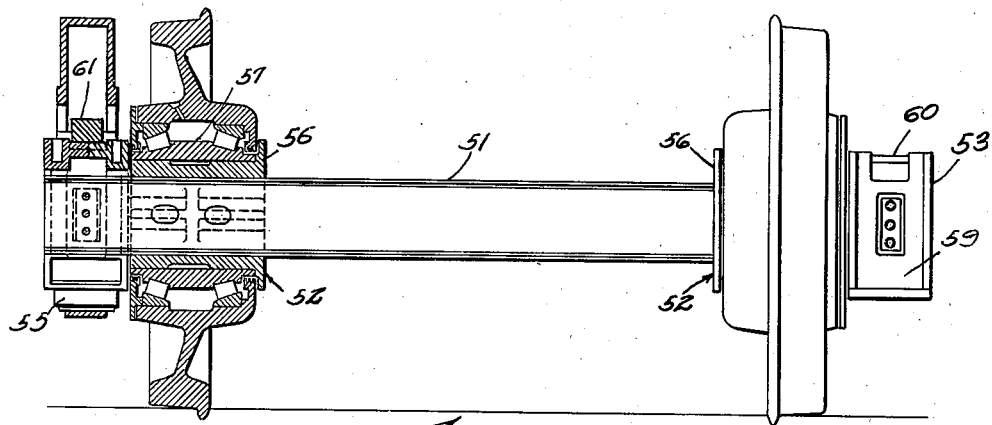
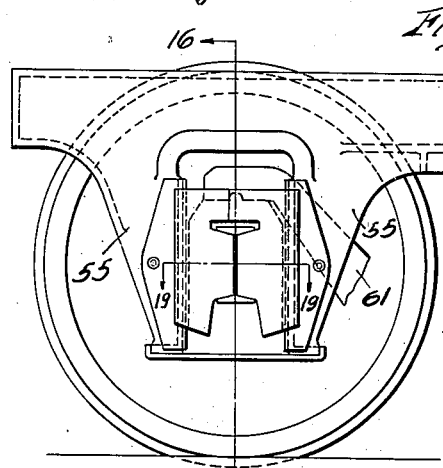
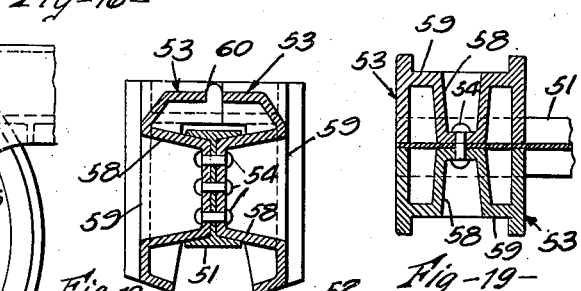
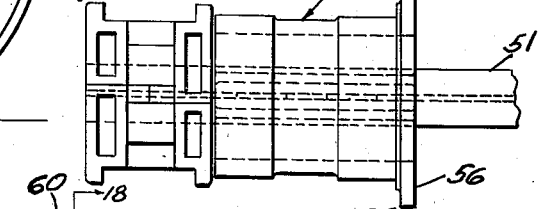
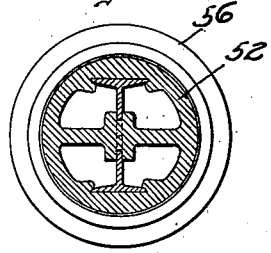
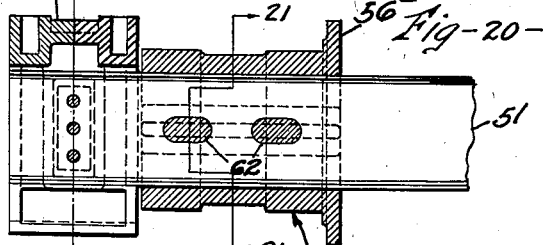
Inventor
Charles F. Frede.
By
Attorney Patented Jan. 25, 1938

2,106,345

UNITED STATES PATENT OFFICE 2,106,345

AXLE STRUCTURE

Charles F. Frede, St. Louis, Mo., assignor to General Steel Castings Corporation, Granite City, Ill., a corporation of Delaware Application October 11, 1933, Serial No. 693,057

15 Claims. (Cl. 105—194)

This invention relates to vehicle wheels and axles and their assembly with the vehicle framing, and more particularly to wheel and axle assemblies for railway trucks.

The weight of railway vehicles is at present carried in many cases upon the supporting axles through friction bearings of brass or similar metal, each bearing and associated journal being housed in a journal box having plane side walls which engage pedestal jaws depending from the supported framing. Frame supporting springs or equalizers are then mounted on top of the journal boxes, springs in the latter case being carried on the equalizers.

Roller bearings have been applied to many railway trucks to mount the wheels on the axle, but the supported weight has been carried on the axles through the usual journal boxes and bearing brasses. It has been suggested to provide a hollow housing for the rotating axle, which housing is supported upon the wheel hubs through roller bearings and itself supports a load carrying member.

One object of the present invention is to provide a novel simplified roller bearing wheel and axle assembly for use particularly in railway trucks.

Another object is to provide a wheel and axle assembly of the above type in which the usual friction bearings and journal boxes are eliminated and in which portions of the axle itself, or members rigid therewith, are shaped to slidably engage the pedestal jaws.

Still another object is to provide a novel one-piece axle structure for use with wheel and axle assemblies of the above type, which shall be preferably of cast metal and include portions for rotatably mounting the vehicle supporting wheels and other portions for slidably engaging the pedestal jaws and for carrying the ends of equalizers.

Another object is to provide a novel wheel and axle assembly for application to outside pedestal trucks in which portions of the axle project outwardly beyond the wheels and slidably engage the pedestals.

These objects and others are attained substantially by the structures illustrated in the accompanying drawings in which—

Figure 1 is a partial top view of a truck illustrating the invention.

Figure 2 is a half vertical transverse section taken on the line 2—2 of Figure 1.

Figure 3 is a partial side view of the structure shown in Figure 1.

Figures 4 and 7 are detail vertical longitudinal sections taken on the corresponding section lines of Figure 1.

Figures 5 and 6 are detail vertical longitudinal sections taken on the corresponding section lines of Figure 2.

Figure 8 is a side view of a portion of a truck showing a modified form of the invention.

Figure 9 is a half vertical transverse section through the axis of the axle shown in Figure 8.

Figure 10 is a similar section showing another modification.

Figures 11 and 13 are top views of modified forms of axles.

Figure 12 is a horizontal section taken approximately on the longitudinal axis of the structure in Figure 11.

Figure 14 is a vertical transverse section taken on the line 14—14 of Figure 11.

Figure 15 is a similar section taken on the line 15—15 of Figure 13.

Figure 16 is a side view of another modified wheel and axle assembly, portions being sectioned on the line 16—16 of Figure 17.

Figure 17 is an end view of the same.

Figures 18 and 21 are transverse sections taken on the corresponding section lines of Figure 22.

Figure 19 is a partial horizontal section taken on the line 19—19 of Figure 17.

Figure 20 is a partial top view of a portion of the modified axle.

Figure 22 is a vertical longitudinal section through the structure in Figure 20, the I-beam being shown in elevation.

The truck shown in Figures 1 to 7, inclusive, includes an integral frame having wheel pieces or side frames 1, end rails 2 and transoms 3. Depending from the side frames 1 are the usual pedestals including jaws 4 provided with renewable wear plates 5. The truck frame and its supported weight is carried upon the rails by means of wheels 6 and hollow axles 7, the outer extremities of which are box-shaped as at 8, and slidably engage the pedestal jaws, or the wear plates 5 thereon. The pedestal jaws are secured together at the bottom by means of tie bars 5a which prevent spreading of the jaws and also prevent separation of the axle and wheels from the truck frame in case of derailment or in case of lifting of the truck in the shop.

Immediately inwardly of portions 8 of the axles are cylindrical portions 9 of diameter slightly greater than the height or width of box-section portions 8, that is, extending radially beyond the walls of portions 8, and mounting the wheels 6 through roller bearing units each including inner race 10, outer races 11 and rollers 12. The inner wall 13 of each wheel fits closely around a slightly raised portion 14 of the axle which forms a shoulder for engaging the edge of inner race 10, and the wall 13 is interiorly corrugated as at 15 to form a dust and oil seal. The front wall of the wheel is closed by means of a plate 16 interiorly corrugated at 17 for a similar purpose. The wheel hub is perforated at 6a to facilitate lubrication of the bearings.

The bearings 12 will ordinarily prevent side play of the wheels, but in case of looseness in the bearings, excessive outward play is prevented by engagement of the wheel with the pedestal jaws 4 and an annular flange 18 braced by ribs 19 prevents excessive inward play of the wheel.

The box-shaped end portions 8 of the axles mount the ends of equalizers 22 through the seats 21 engaging the transverse ribs 20. These equalizers support the truck frame in a familiar manner by means of coiled springs (not shown) engaging spring seats 23 on the undersurfaces of the truck side frames. The side walls of the end portions of the axles are substantially flat and present substantial flat faces for slidably engaging the pedestals and stabilizing the axle during transmission of horizontal forces thereto from the frame and during relative vertical movement of the frame due to its supporting springs.

The axle shown is of integral cast construction and is hollow throughout, the body portion 24 thereof being oval shape, and perforations 25 in the end walls thereof facilitate casting and cleaning and are closed by plates 26 welded in place. The depth of the body portion is preferably greater than the width thereof to better withstand the stresses to which the axle is subjected.

In Figures 8 and 9, the box-shaped portions 27 at the ends of axle, which slidably engage the pedestal jaws 28, are larger than the cylindrical wheel mounting portions 29 and are provided at the top with transverse ribs 27a and a connecting rib 27b for retaining the ends of equalizers 30 mounted on the box without the interposition of the separate equalizer seats shown in the previous form. Each wheel 31 is supported on a portion 29 of the axle by means of roller bearings 32, engaging grooves 33 in the outer surface of portion 29, and outer races 34, the separate inner race being omitted. The central openings in the wheel and in the outer races 34 are wide enough to permit application of the wheel and races longitudinally over the enlarged end portion 27 of the axle and plates 35, which are split in halves and bolted respectively to the inner and outer surfaces of the wheel, close the space around the axle which constitutes the bearing compartment therein. Grooves 36 in the portion 29 of the axle and ribs 37 on plates 35 serve as oil and dust seals. The rollers are retained in semi-circular units and are assembled on the grooves 33 before application of the wheels.

The structure in Figure 10 is similar to that shown in Figures 1 to 7 with the exception that the wheel 36 is shown supported upon the axle 37 by means of helical type rollers 38 instead of the solid roller bearings shown in the previous forms. The invention contemplates the use of balls or any suitable type of non-friction bearing. It will be understood that in each of the forms the anti-friction elements will be held in position by cages (not shown) of familiar form.

In Figures 11, 12 and 14 is shown a one-piece cast axle including box-shaped portions 39 at the outer extremities, with ribs 40 for retaining the equalizer seat (shown at 21 in Figure 2), cylindrical portions 41 for mounting the roller bearings and wheels (not shown), and an I-section body portion 42. Thrust flange 43 is reinforced by ribs 44 and 45, the former being in alinement with the web of the body part 42 and the latter being in alinement with the top and bottom flanges thereof.

In Figures 13 and 15, portions 46 and 47 of the axle are identical with the corresponding portions of Figure 11 but the body portion 48 is box-sectioned and ribs 49, bracing flange 50, merge with the center portions of the side walls thereof.

In Figures 16 to 22, the body of the axle is formed of a structural steel I-beam 51 which is provided with cast roller bearing mountings 52 and a pair of castings 53 riveted as at 54 to each end for engaging the pedestal jaws 55. The bearing mounting 52 is preferably cast around the I-beam and includes an inner radial flange 56 and a generally cylindrical outer surface for receiving the inner bearing race 57. The web of the I-beam is perforated at 62 and the casting 52 extends through these perforations to insure a rigid and permanent connection.

The end castings 53 are identical, each including a pocket 58 for receiving the rivets 54, a flat side 59 around pocket 58 for engaging the pedestal jaw, and a rib 60 extending half way across the top of the casting. When the castings are assembled, the ribs 60 form a substantially continuous rib for retaining the equalizer 61. Each rib 60 forms a complete longitudinal half of the assembled rib and the half round formation of each rib 60 insures a better shaped rib than would be the case if the rib were split along the longitudinal center.

Obviously, the body portion of the axle between the wheel mounting portions may assume any suitable form other than the cylindrical, I-section, and box-section shapes shown in Figures 1, 11 and 13, respectively. Also as previously suggested, the forms of roller bearings shown are not essential, nor is the form of truck frame important, and these may be modified in various respects as will occur to those skilled in the art without departing from the spirit of the invention. The exclusive use of all such modifications as come within the appended claims is contemplated.

What is claimed is:

1. In a railway vehicle, a side frame including a pedestal, a wheel-mounting axle including a main body part slidably engaging the pedestal jaws, and a removable seat on said part for mounting an equalizer element.

2. A hollow axle for a railway vehicle comprising a cylindrical exterior portion for rotatably mounting a supporting wheel, and a box-section part adjacent to and integral with said cylindrical portion with its upper wall forming a seat for mounting an equalizer element and with side walls for engaging pedestal jaws.

3. In a railway vehicle, framing including pedestals, a one-piece cast metal hollow axle including end portions of rectangular section slidably engaging the pedestal jaws, and cylindrical section portions adjacent thereto and wheels rotatably mounted on said axle inwardly of said end portions.

4. In a railway vehicle truck, a pedestal, one-piece axle structure comprising a cylindrical section portion for extending through and rotatably mounting a supporting wheel, a rectangular section part located outwardly of said portion engaging the vehicle pedestal, and a shoulder located immediately inwardly of said portion for engaging and positioning a wheel hub and receiving wheel thrust.

5. An integral cast vehicle axle structure comprising hollow end portions each with an external part for rotatably mounting a vehicle supporting wheel and a part with flat side walls for engaging the vehicle pedestal jaws, and a body portion connecting said end portions, the end walls of the axle being perforated to facilitate casting and cleaning.

6. An integral cast vehicle axle structure comprising hollow end portions each with a part for rotatably mounting a vehicle supporting wheel and a part with flat side walls for engaging the vehicle pedestal jaws, a body portion connecting said end portions, and transverse ribs surrounding the axle adjacent the ends of said wheel mounting parts spaced from said pedestal engaging parts.

7. An axle structure for a railway vehicle comprising a flanged body part of solid structural steel construction and cast structure secured to said part for mounting wheel-supporting roller bearings and for engaging the vehicle pedestal jaws.

8. An axle structure for a railway vehicle comprising a body part of structural steel construction, an externally cylindrical element secured to said part for rotatably mounting a vehicle supporting wheel, and a plurality of members rigidly secured to said part in complementary relation and forming structure for engaging the vehicle pedestal legs.

9. In a railway vehicle, an axle including an externally cylindrical portion for mounting a supporting wheel, means holding said axle against rotation and an equalizer mounted directly on the top of said axle.

10. A railway vehicle axle having an end part including a portion with a cylindrical periphery for rotatably mounting a supporting wheel, the face of the portion of said end part projecting beyond said cylindrical portion being offset inwardly from said periphery to permit application and removal of a wheel over the end of the axle, said projecting portion having straight upright sides for engaging pedestal jaws and having a top face arranged for carrying an equalizer.

11. A hollow axle for a railway vehicle comprising portions with cylindrical exteriors for rotatably mounting supporting wheels, and end parts of box section adjacent to and integral with said cylindrical portions and having straight upright sides for sliding along pedestal jaws.

12. In a railway vehicle, wheel pieces including pedestal jaws, a hollow axle having end portions with straight upright side walls slidably engaging said jaws and having intermediate portion with cylindrical exterior walls, and wheels movable over said end portions and rotatably mounted on said cylindrical portion.

13. In a railway vehicle, a wheel piece including pedestal jaws, a hollow axle having a portion with straight side walls slidably engaging said jaws and having a portion with a cylindrical wall, a wheel rotatably mounted on said cylindrical portion, said first-mentioned portion having a top wall, and an equalizer overlying and supported by said top wall.

14. In a railway truck, a frame having pedestal jaws, a hollow axle having an exteriorly cylindrical portion and having a box section part integral with and adjacent said cylindrical portion with side walls slidably engaging said jaws, a supporting wheel rotatably mounted on said cylindrical portion, and an equalizing bar carried on said box section part.

15. In a railway vehicle truck, a wheel, an axle including an externally cylindrical portion for mounting said wheel, and also including an externally straight-sided portion, a frame with a pedestal with straight jaw elements slidably receiving said straight-sided axle portion and holding it against rotation, and a truck equalizer bar supported by the upper portion of said axle and movable with said axle in said frame pedestal.

CHARLES F. FREDE.